United States Patent
Tani

[19]

[11] Patent Number: 6,105,248
[45] Date of Patent: Aug. 22, 2000

[54] METHOD OF FORMING POLYMER INSULATOR

[75] Inventor: Takao Tani, Aichi, Japan

[73] Assignee: NGK Insulators, Ltd., Japan

[21] Appl. No.: 09/169,364

[22] Filed: Oct. 9, 1998

[30] Foreign Application Priority Data

Oct. 13, 1997 [JP] Japan .................................. 9-278318

[51] Int. Cl.⁷ .................................................. H01B 19/00
[52] U.S. Cl. ........................... 29/887; 156/245; 174/211; 174/137 R; 174/138 D
[58] Field of Search .............................. 29/887, 505, 447, 29/592; 156/245; 428/34.9, 35.1, 913; 174/211, 137 R, 138 D, 176

[56] References Cited

U.S. PATENT DOCUMENTS

| | | | |
|---|---|---|---|
| 4,045,604 | 8/1977 | Clabburn | 428/36 X |
| 4,670,973 | 6/1987 | Dumont et al. | 29/631 X |
| 4,714,800 | 12/1987 | Atkins et al. | 174/73 R X |
| 4,845,318 | 7/1989 | Clabburn et al. | 174/179 |
| 5,298,301 | 3/1994 | Midgley et al. | 428/34.9 |

*Primary Examiner*—Jessica J. Harrison
*Assistant Examiner*—Binh-An Nguyen
*Attorney, Agent, or Firm*—Wall Marjama Bilinski & Burr

[57] ABSTRACT

A method of forming a polymer insulator is disclosed. The improvement includes the steps of: setting a formed body, having a construction such that a pre-form material is arranged around a rod and end caps are arranged at both end portions of the rod, between an upper die and a lower die, each die having cavities for forming sheds and sheath portions of the polymer insulator; and forming the sheds and the sheath portions of the polymer insulator by means of a compression forming by connecting the upper die and the lower die with compression pressure; wherein the end cap has a shape such that it is accommodated in the cavity for a shed formation.

6 Claims, 6 Drawing Sheets

FIG_2a
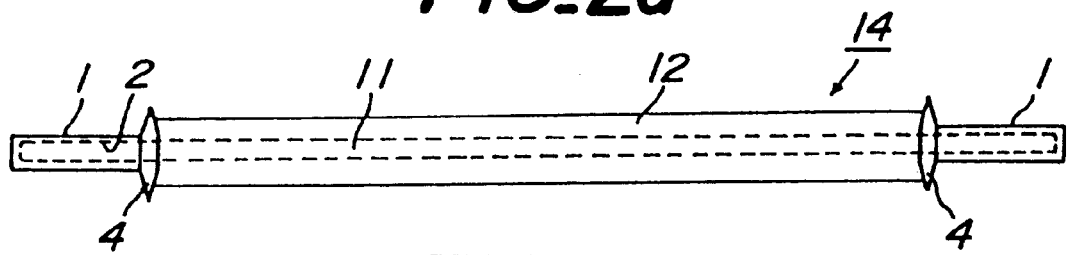
FIG_2b
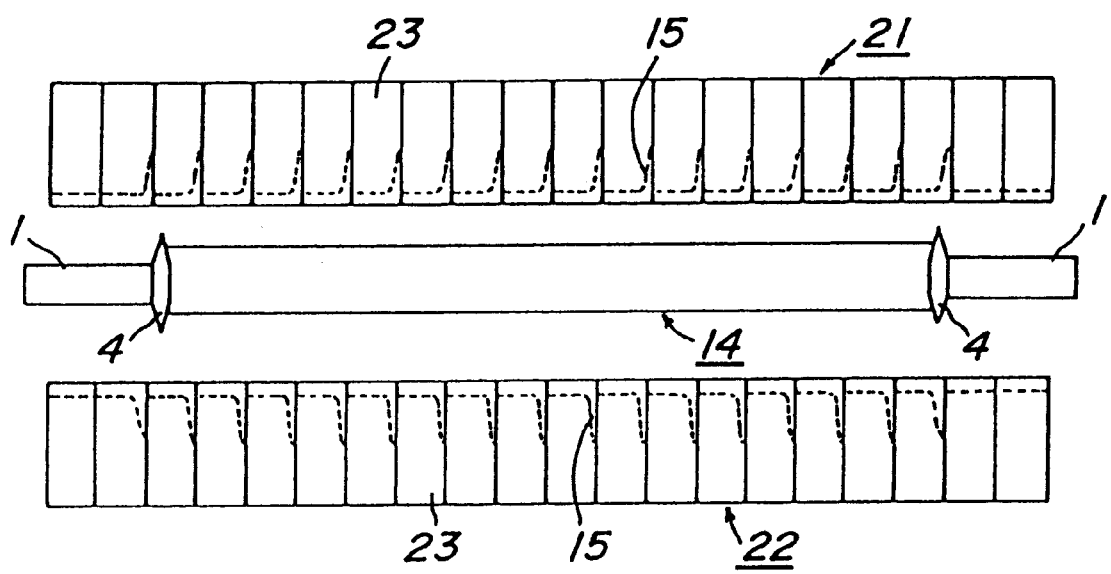
FIG_2c
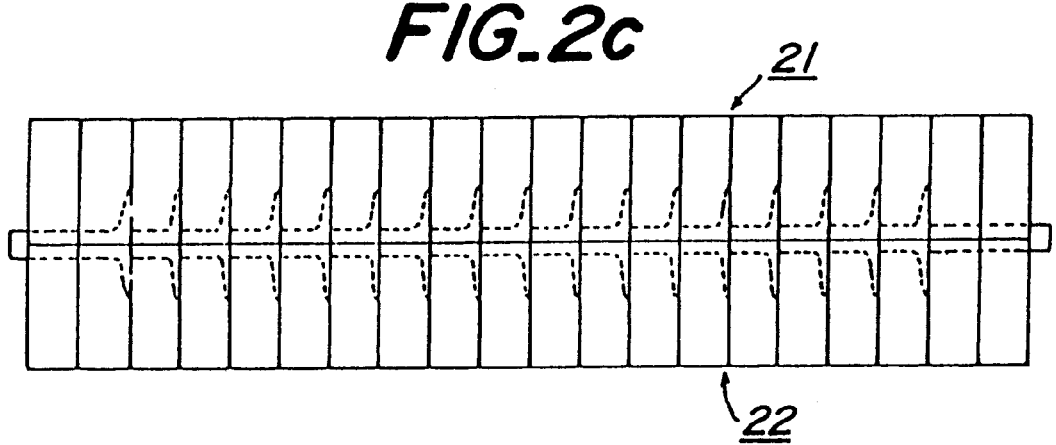
FIG_2d
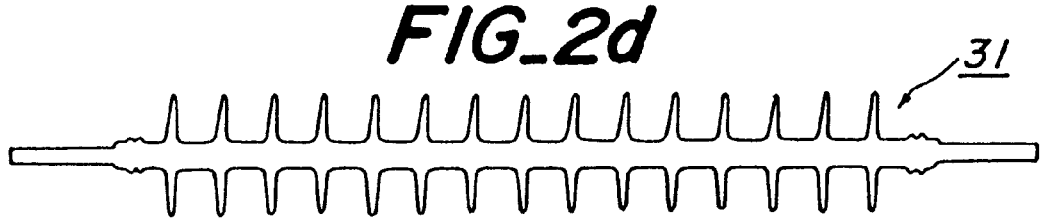

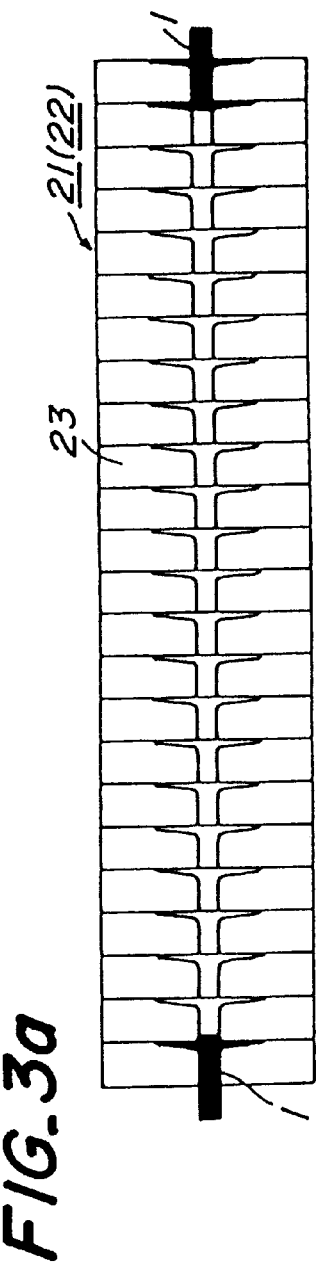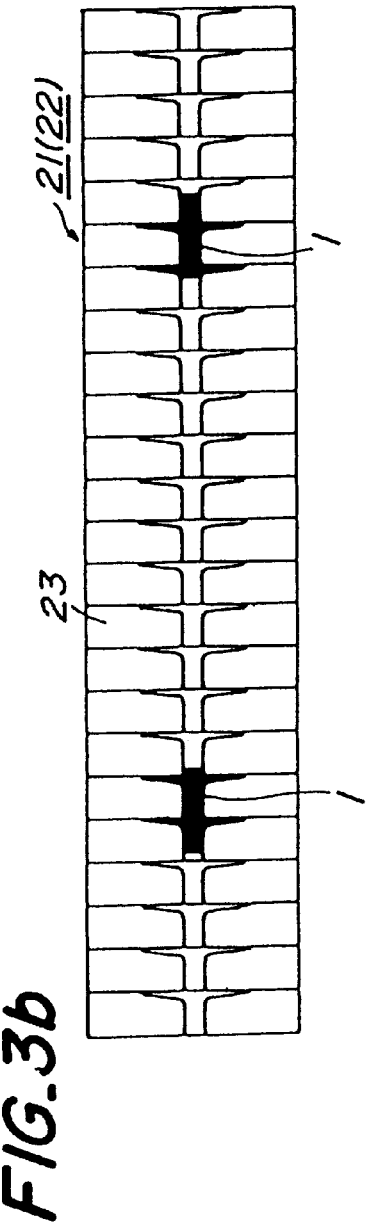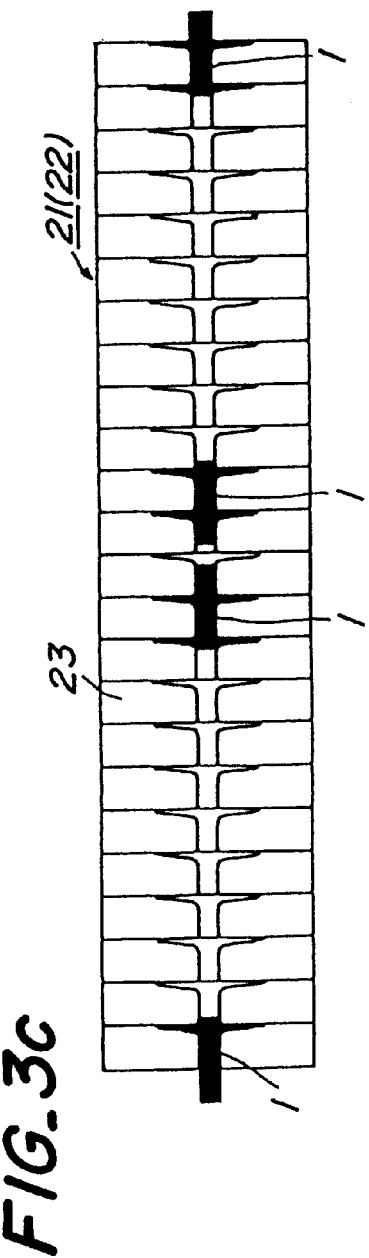

FIG_4
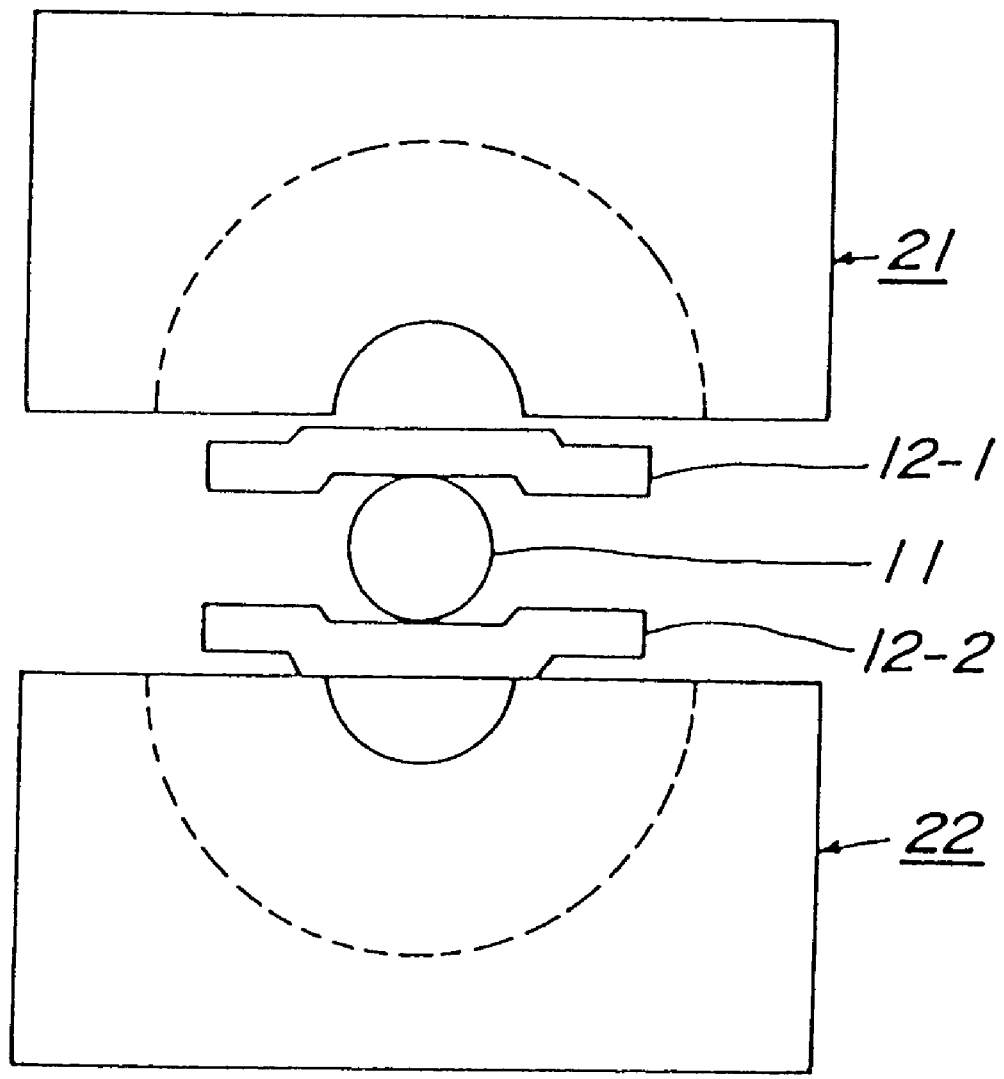

PRIOR ART FIG_5a
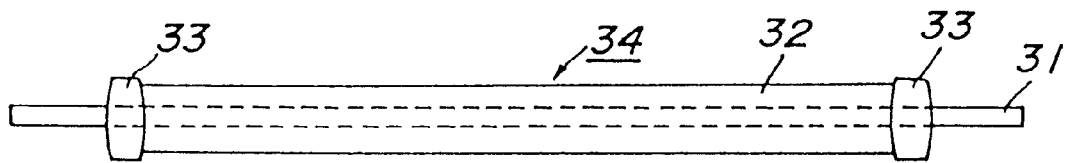
PRIOR ART FIG_5b
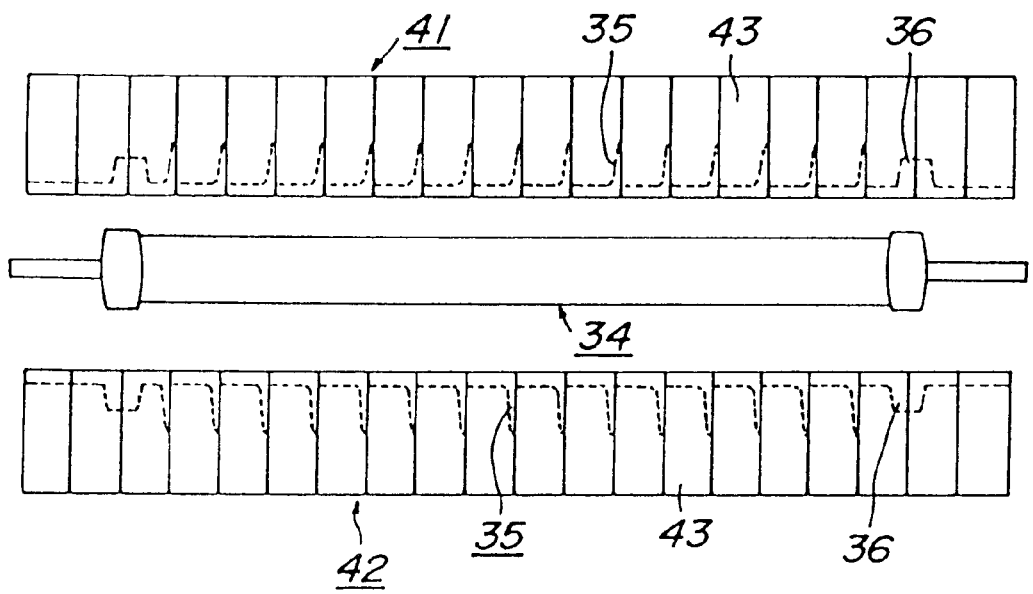
PRIOR ART FIG_5c
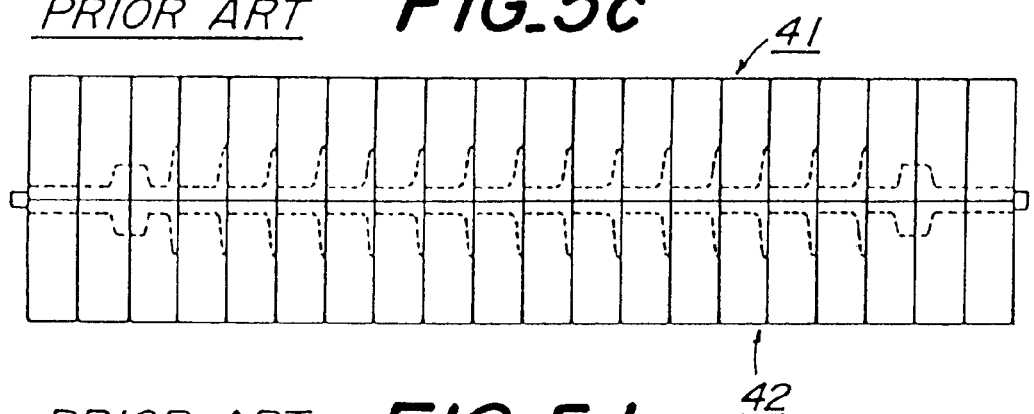
PRIOR ART FIG_5d
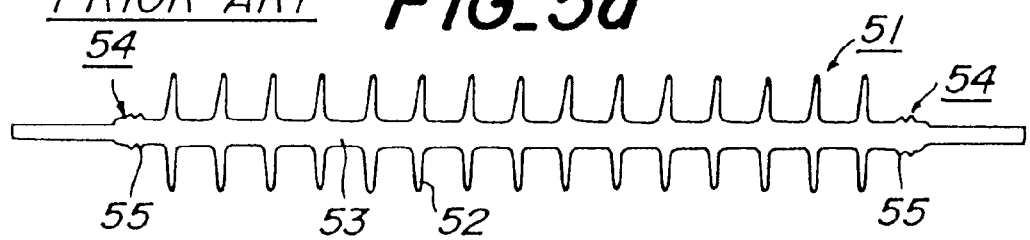

METHOD OF FORMING POLYMER INSULATOR

BACKGROUND OF THE INVENTION

1. Field of the Invention

The present invention relates to a method of forming a polymer insulator, particularly relates to a forming method in which polymer insulators having various shed numbers can be formed without reconstructing a die used for forming.

2. Description of Related Art

A compression forming technique for forming a polymer insulator known. FIGS. 5a to 5d are schematic views showing successive steps of forming the polymer insulator by means of the known compression forming. At first, as shown in FIG. 5a, a formed body 34 is prepared. The formed body 34 has a construction such that a pre-form material 32 made of silicone rubber is arranged around an FRP rod 31 and end caps 33 are arranged at both end portions of the FRP rod 31. It should be noted that a winding amount of the pre-form material 32 is determined corresponding to the number of sheds. Moreover, a cavity having a predetermined shape is arranged at a side surface of the end cap 33 to which the pre-form material 32 is contacted. Then, the pre-form material 32 is filled in the cavity when performing the compression forming.

Then, as shown in FIG. 5b, the thus prepared formed body 34 is set between an upper die 41 and a lower die 42. Each of the upper die 41 and the lower die 42 has cavities 35 used for forming sheds and sheath portions of the polymer insulator and also cavities 36 used for accommodating the end cap 33. Generally, the upper die 41 and the lower die 42 are respectively constructed by integrating a plurality of segments 43, and, prior to the compression forming, they are constructed corresponding to the number of sheds of the polymer insulator to be formed. After that, as shown in FIG. 5c, the upper die 41 is pressed to the lower die 42 to perform the compression forming. After the compression forming, the upper die 41 is detached from the lower die 42, and further the end caps 33 are removed from the FRP rod 31 so as to obtain a polymer insulator formed body 51.

The thus obtained polymer insulator formed body 51 has an overcoat layer comprising sheds 52 and sheath portions 53, which is arranged around the FRP rod 31, and also has securing metal fitting connection portion 54 at its both end portions. Projection portions 55 are arranged on an entire circumferential surface of the securing metal fitting connection portion 54. These projection portions 55 are served as an 0 ring when a securing metal fitting not shown is connected to the securing metal fitting connection portion 54. Therefore, it is possible to improve seal performance of a connection boundary between the securing metal fitting and the overcoat layer.

As mentioned above, in the known method of forming the polymer insulator, in order to achieve a high seal reliability between the securing metal fitting and the securing metal fitting connection portion 54, it is necessary to work the securing metal fitting connection portion 54 precisely and to arrange the projection portions 55 on an outer surface of the securing metal fitting connection portion 54. Therefore, the compression forming must be performed after setting the end caps 33 at both ends of the FRP rod 31. In this case, it is possible to achieve working precision of the securing metal fitting connection portion 54. However, when the polymer insulator having a different shed number from that of the previous one is to be formed, the upper die 41 and the lower die 42 must be reconstructed corresponding to the shed number of the next polymer insulator.

Here, it is assumed that one polymer insulator is formed by using the upper die 41 (the lower die 42) shown in FIG. 6a and then the other polymer insulator having the shed number smaller than that of the previous polymer insulator is to be formed. In this case, in order to decrease the number of the cavities 35 and to change a position of the cavity 36 for the end cap 33, it is necessary to reconstruct the upper die 41 (the lower die 42) as shown in FIG. 6b by replacing the segments 43. Therefore, in the known method of forming the polymer insulator, there is a drawback such that a remarkable time is necessary for reconstructing the die.

SUMMARY OF THE INVENTION

An object of the invention is to eliminate the drawbacks mentioned above and to provide a method of forming a polymer insulator in which polymer insulators having various shed numbers can be formed without reconstructing a die used for forming.

According to the invention, a method of forming a polymer insulator comprises the steps of: setting a formed body, having a construction such that a pre-form material is arranged around a rod and end caps are arranged at both end portions of the rod, between an upper die and a lower die, each die having cavities for forming sheds and sheath portions of the polymer insulator; and forming the sheds and the sheath portions of the polymer insulator by means of a compression forming by connecting the upper die and the lower die with compression pressure; wherein the end cap has a shape such that it is accommodated in the cavity for a shed formation.

In the present invention, the end cap, which can be accommodated in the cavity for a shed formation of the polymer insulator, is used. Therefore, if the shed number of the polymer insulator to be formed is varied, it is possible to form the polymer insulators with different shed number without reconstructing the die only by changing an insertion position of the end cap in the cavities for the shed formation. Moreover, under some circumstances, it is possible to form a plurality of polymer insulators at the same time by using the same die.

Further, in the present invention, if a portion of the end cap which is accommodated in the cavity for a shed formation has a height larger than a thickness of the pre-form material, a handling of the formed body before setting becomes easier. Moreover, if a portion of the end cap which is accommodated in the cavity for a shed formation has a circular plate shape having a ridge cross section, it is possible to easily insert such a portion of the end cap into the cavity for a shed formation even when a shape of the cavity is varied. Furthermore, if an outer root portion of the end cap which is accommodated in the cavity for a shed formation is inserted into the cavity with no space when the upper die and the lower die are connected during the compression forming, it is possible to receive a pressure from the pre-form material during the compression forming with no damage of the end cap. These embodiments mentioned above are preferred embodiments of the present invention.

BRIEF DESCRIPTION OF THE DRAWINGS

FIGS. 2a and 2d are schematic views respectively illustrating successive steps for forming a polymer insulator according to the invention by using the end cap having the construction shown in FIG. 1;

FIGS. 3a to 3c are schematic views respectively depicting a die construction when performing the method of forming a polymer insulator according to the invention;

FIG. 4 is a schematic view showing another embodiment of the method of forming a polymer insulator according to the invention;

FIGS. 5a to 5d are schematic views respectively illustrating successive steps for performing a known method of forming a polymer insulator.

DESCRIPTION OF THE PREFERRED EMBODIMENT

Figure 1:
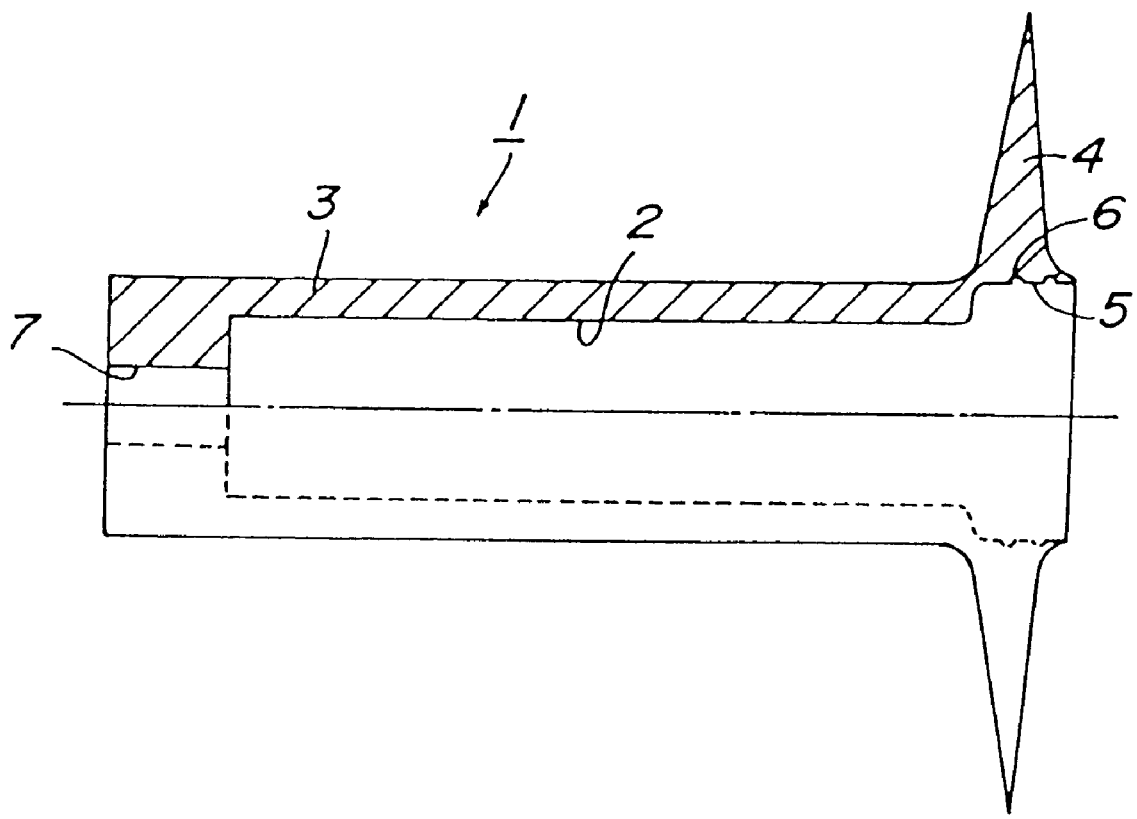
FIG. 1 is a schematic view showing one embodiment of an end cap used for a method of forming a polymer insulator according to the invention.
Figure 6A:
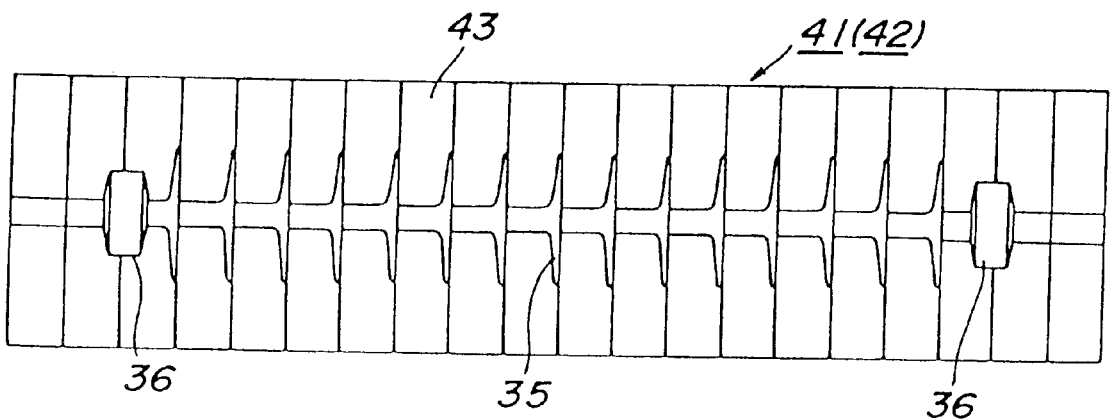
FIGS. 6a and 6b are schematic views respectively depicting a die construction when performing a known method of forming a polymer insulator.
Figure 6B:
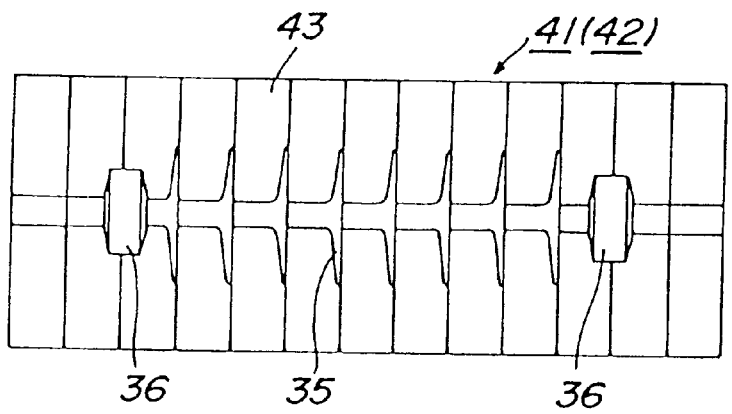

FIG. 1 is a schematic view showing one embodiment of an end cap used for a method of forming a polymer insulator according to the invention. In the embodiment shown in FIG. 1, an end cap 1 according to the invention comprises: an end cap main body 3 having a cylindrical shape in which a hole 2 for inserting an FRP rod therein is arranged at its center portion; and a projection portion 4 for a positioning which is extended vertically with respect cap main body 3. A step portion 5 is arranged at an open end portion side of the end cap main body 3 to form a cavity. This cavity serves for forming a securing metal fitting connection portion for an overcoat layer by filling silicone rubber therein under a condition such that an FRP rod 6 is inserted into the hole 2. In order to arrange the projection portion 4 on an outer surface of the securing metal fitting connection portion, a recess 6 is formed in the step portion 5. A small hole 7 for an air discharge which is communicated with the hole 2 is arranged at a closed end portion opposite to the open end portion of the end cap main body 3.

An important point for performing the method of forming a polymer insulator according to this embodiment is that the projection portion 4 of the end cap 1 has a shape such that it is accommodated in the cavity for a shed formation of a die. In the embodiment shown in FIG. 1, as a preferred embodiment, the projection portion 4 has a circular plate shape having a ridge cross section, thereby achieving an easy insertion into the cavity for a shed formation having a tapered cross section. Moreover, as a preferred embodiment, in the case that the end caps 1 are set at both ends of the FRP rod together with the pre-form material, the projection portion 4 has a height H larger than a thickness of the pre-form material. In this case, since the end caps 1 can bind overall both ends of the pre-form material when setting the formed body in the die, a handling of the formed body becomes easier. Further, as a preferred embodiment, an outer root portion 4a of the projection portion 4, to which the pre-form material is not contacted, is accommodated in the cavity for a shed formation with no space when an upper die and a lower die are connected during the compression forming. In this case, it is possible to receive a pressure from the pre-form material during the compression forming without slipping the end caps 1.

FIGS. 2a to 2d are schematic views respectively showing successive steps for forming a polymer insulator according to the invention by using the end cap 1 having the construction shown in FIG. 1. These steps are same as the known steps shown in FIGS. 5a to 5d except that the end cap 1 having the construction shown in FIG. 1 is used. At first, as shown in FIG. 2a, a pre-form material 12 made of silicone rubber is wound around an FRP rod II and the end caps 1 having the construction shown in FIG. 1 are arranged to the FRP rod 11 at both ends of the pre-form material 12 to prepare a formed body 14. In this case, a positioning operation between the FRP rod 11 and the end cap 1 is performed in such a manner that the end portion of the FRP rod 11 is set to be connected with a bottom portion of the hole 2 of the end cap 1.

Then, as shown in FIG. 2b, the thus prepared formed body 14 is set between an upper die 21 and a lower die 22. Each of the upper die 21 and the lower die 22 has cavities 15 for forming sheds and sheath portions of the polymer insulator. Generally, the upper die 21 and the lower die 22 are respectively constructed by integrating a plurality of segments 23. The upper die 21 and the lower die 22 are assembled prior to perform a forming operation corresponding to the number of sheds of the polymer insulator to be formed. After that, as shown in FIG. 2c, the upper die 21 is pressed to the lower die 22 to perform a compression forming. In the compression forming, since the projection portion 4 of the end cap 1 has a shape such that it is accommodated in the cavity 15 for a shed formation, it is not necessary to use a special cavity for accommodating the end cap according to the known method. After the compression forming, the upper die 21 is detached from the lower die 22 and further the end caps 1 are removed from the FRP rod 11 to obtain a polymer insulator formed body 31 as shown in FIG. 2d.

According to the method of forming a polymer insulator according to the invention, the projection portion 4 of the end cap 1 has a shape such that it can be accommodated in the cavity 15. Therefore, if a position of the end cap 1 with respect to the FRP rod 11 is varied in response to the number of sheds of the polymer insulator to be formed, the following using types (1)–(3) can be achieved without reconstructing the dies (21 and 22):

Type (1); as shown in FIG. 3a, it is possible to form the polymer insulator formed body 31 by using all of the dies (21 and 22);

Type (2); as shown in FIG. 3b, it is possible to form the polymer insulator formed body 31 having a less shed number than that of the embodiment shown in FIG. 3a; and Type (3); as shown in FIG. 3c, it is possible to form two polymer insulator formed bodies 31 at one forming operation by arranging two sets of the formed bodies 14 in the dies (21 and 22).

In this manner, according to the present invention, if the polymer insulator to be formed has the same shape and the same diameter of the FRP rod 11, it is possible to form the polymer insulator by one same dies without reconstructing (re-assembling) the dies (21 and 22). In the embodiment shown in FIGS. 3a to 3c, in order to make clear a positional relation between the dies (21 and 22) and the end cap 1, portions such as the FRP rod 11 and the pre-form material 12 are omitted here.

The present invention is not limited to the embodiment mentioned above, but various modifications are possible. For example, the end cap, which can be accommodated in the cavity for a shed formation of the polymer insulator, is used. Therefore, if the shed number of the polymer insulator to be formed is varied, it is possible to form the polymer insulators with different shed number without reconstructing the die only by changing an insertion position of the end cap in the cavities for the shed formation.

As clearly understood form the above explanation, according to the invention, the end cap, which can be accommodated in the cavity for a shed formation of the polymer insulator, is used. Therefore, if the shed number of the polymer insulator to be formed is varied, it is possible to form the polymer insulators with different shed number without reconstructing the die only by changing an insertion position of the end cap in the cavities for the shed formation. Moreover, under some circumstances, it is possible to form a plurality of polymer insulators at the same time by using the same die.

What is claimed is:

1. A method of forming a polymer insulator comprising the steps of:

setting a formed body, having a construction such that a pre-form material is arranged around a rod and end caps are arranged at both end portions of the rod, between an upper die and a lower die, each die having cavities for forming sheds and sheath portions of the polymer insulator, and forming the sheds and the sheath portions of the polymer insulator by means of compression forming by connecting the upper die and the lower die with compression pressure;

wherein at least one of the end caps has a shape that allows it to be accommodated in at least one of said cavities for forming sheds and sheath portions of the polymer insulator.

2. The method according to claim 1, wherein said at least one end cap has a projection portion for adjusting its position within said at least one of said cavities.

3. The method according to claim 1, wherein the upper die and the lower die are respectively constructed by integrating a plurality of segments.

4. The method according to claim 1, wherein a portion of said at least one end cap has a height larger than a thickness of the pre-form material.

5. The method according to claim 1, wherein a portion of said at least one end cap has a circular plate shape having a ridge cross section.

6. The method according to claim 1, wherein an outer root portion of said at least one end cap completely contacts said at least one of said cavities when the upper die and the lower die are connected during the compression forming.

* * * * *